(12) United States Patent
Sachs

(10) Patent No.: US 7,103,736 B2
(45) Date of Patent: Sep. 5, 2006

(54) SYSTEM FOR REPAIR OF ROM PROGRAMMING ERRORS OR DEFECTS

(75) Inventor: Howard G. Sachs, Los Altos, CA (US)

(73) Assignee: Telairity Semiconductor, Inc., Santa Clara, CA (US)

( * ) Notice: Subject to any disclaimer, the term of this patent is extended or adjusted under 35 U.S.C. 154(b) by 418 days.

(21) Appl. No.: 10/638,993

(22) Filed: Aug. 11, 2003

(65) Prior Publication Data
US 2005/0039071 A1  Feb. 17, 2005

(51) Int. Cl.
G06F 12/00 (2006.01)

(52) U.S. Cl. .................. 711/159; 711/144; 711/145; 711/156; 711/163; 711/170; 714/6; 714/8; 714/35; 714/42; 713/1; 713/2

(58) Field of Classification Search ............... 711/159, 711/144, 145, 156, 163, 170; 714/6, 8, 35, 714/42; 713/1, 2
See application file for complete search history.

(56) References Cited

U.S. PATENT DOCUMENTS

| | | | | |
|---|---|---|---|---|
| 5,274,829 A | * | 12/1993 | Hotta et al. ............... 712/205 |
| 5,325,504 A | * | 6/1994 | Tipley et al. ............... 711/128 |
| 5,634,108 A | * | 5/1997 | Freeman ..................... 711/118 |
| 5,796,974 A | * | 8/1998 | Goddard et al. ............ 712/211 |
| 5,987,605 A | * | 11/1999 | Hill et al. ..................... 713/2 |
| 6,029,209 A | * | 2/2000 | Cornaby et al. .............. 710/5 |
| 6,092,229 A | * | 7/2000 | Boyle et al. ............... 714/748 |
| 6,260,157 B1 | * | 7/2001 | Schurecht et al. ............. 714/8 |
| 6,438,664 B1 | * | 8/2002 | McGrath et al. ........... 711/154 |
| 6,754,828 B1 | * | 6/2004 | Marisetty et al. ............. 726/2 |
| 2003/0126424 A1 | * | 7/2003 | Horanzy et al. .............. 713/2 |
| 2003/0236970 A1 | * | 12/2003 | Palmer et al. ................. 713/1 |

* cited by examiner

Primary Examiner—Stephen C. Elmore
(74) Attorney, Agent, or Firm—Townsend and Townsend and Crew LLP

(57) ABSTRACT

A system is disclosed for use of imperfect ROMs in embedded systems. The ROM or other memory accessible upon start-up of the system, includes a stored program which checks an external source to determine whether any of the information in the ROM should be replaced. If it should be replaced, then the system retrieves good information from an external source and stores it into a cache memory. By setting a "lock" bit, erasure of the replacement information is prevented.

18 Claims, 2 Drawing Sheets

SYSTEM FOR REPAIR OF ROM PROGRAMMING ERRORS OR DEFECTS

BACKGROUND OF THE INVENTION

This invention relates to electronic systems, and in particular to a system in which a partially defective nonvolatile memory may still be satisfactorily employed without creating erroneous results. In addition this invention also relates to the use of nonvolatile memories having programming errors or nonvolatile memories which lack programming upgrades which would ordinarily render the device inoperative or undesirable.

In embedded systems, on-chip read only memories are important because they provide a high density technique for storing program instructions and data. For example, in some embedded systems, the entire system will operate under control of the program instructions stored in a ROM on the same chip as the processor and other components. These ROMs are typically mask programmable because at the time of manufacture of the entire chip, one of the masks used during that manufacturing process will define the state of each bit in the ROM. A ROM can be thought of as having a layer of wires arranged in rows separated by a layer of insulating material from another layer of wires arranged in columns. Where short circuits are formed between the rows and columns, for example, by providing an opening in the insulation layer using a mask, that address can be considered as representative of a data bit. In this manner a short circuit between the row and column can be considered a "1" and an open connection between the row and column considered a "0." In practice a transistor is used to select a word or a bit line. This transistor is selected (turned on) when a particular row is selected. The transistor can be programmed at the metal or diffusion layers of conventional integrated circuit manufacturing technologies.

A significant disadvantage of the use of ROMs in such embedded systems or systems on a chip, however, is the difficulty of changing the stored program. After the system is developed, it may be determined that the stored program contains errors, is defective, or otherwise requires revision. Alternatively, the stored program may be satisfactory, but it would be desirable to revise the stored program in some manner, or to upgrade the program for use of the embedded system in a different product. Generally such flexibility has not been possible, and the usual approach to such problems has been to change the masks for the ROM and remanufacture the device.

Because any change in the stored program when the ROM is mask programmable requires the development of a new mask and the manufacture of a new integrated circuit, it is difficult and expensive to make changes in the ROM after the fabrication of a chip. Development of a new mask set typically costs hundreds of thousands of dollars and take weeks or months to complete. Accordingly, what is needed is a method of assuring that the system operates correctly, even if the ROM includes an incorrect instruction or incorrect data.

BRIEF SUMMARY OF THE INVENTION

A system for enabling the use of imperfect ROMs in embedded systems is provided. Typically, a small program is added to the embedded ROM to cause the chip to check an outside source of information, for example, an external memory, the internet, or some other source to determine if any of the information in the ROM should be replaced. If the program determines that all of the information in the ROM is correct, the system operates normally. On the other hand, if the external source indicates that some of the information in the ROM is defective or requires replacement or revision, the replacement information is retrieved. It is then stored in a cache memory and given an address which matches the address of the defective information or of the information to be otherwise replaced. When this is performed, a lock bit on the cache memory is set to prevent the newly-retrieved, corrected information from being replaced at a later time by defective or incorrect information from the ROM. In the event a large block of instructions need to be replaced or added, then a branch instruction is stored in the cache memory which causes control to be transferred to an external memory which contains the new or added instructions. At the end of execution of this series of instructions, a branch is issued back to the appropriate code in the ROM. In the event large blocks of data need to be replaced it is possible to insert instructions in the cache that cause an indirection of the load instructions.

In one embodiment, the system includes a nonvolatile memory that has locations for the storage of information, and an external memory having locations for the storage of revised information to use as a replacement for information stored in the nonvolatile memory. A cache memory is also provided which has addressable storage locations, at least some of which can be protected from erasure. In response to operation of the system, a startup program stored in the nonvolatile memory is executed to determine whether there are any locations in the nonvolatile memory at which the stored information is to be replaced with revised information.

DETAILED DESCRIPTION OF THE INVENTION

Figure 1:
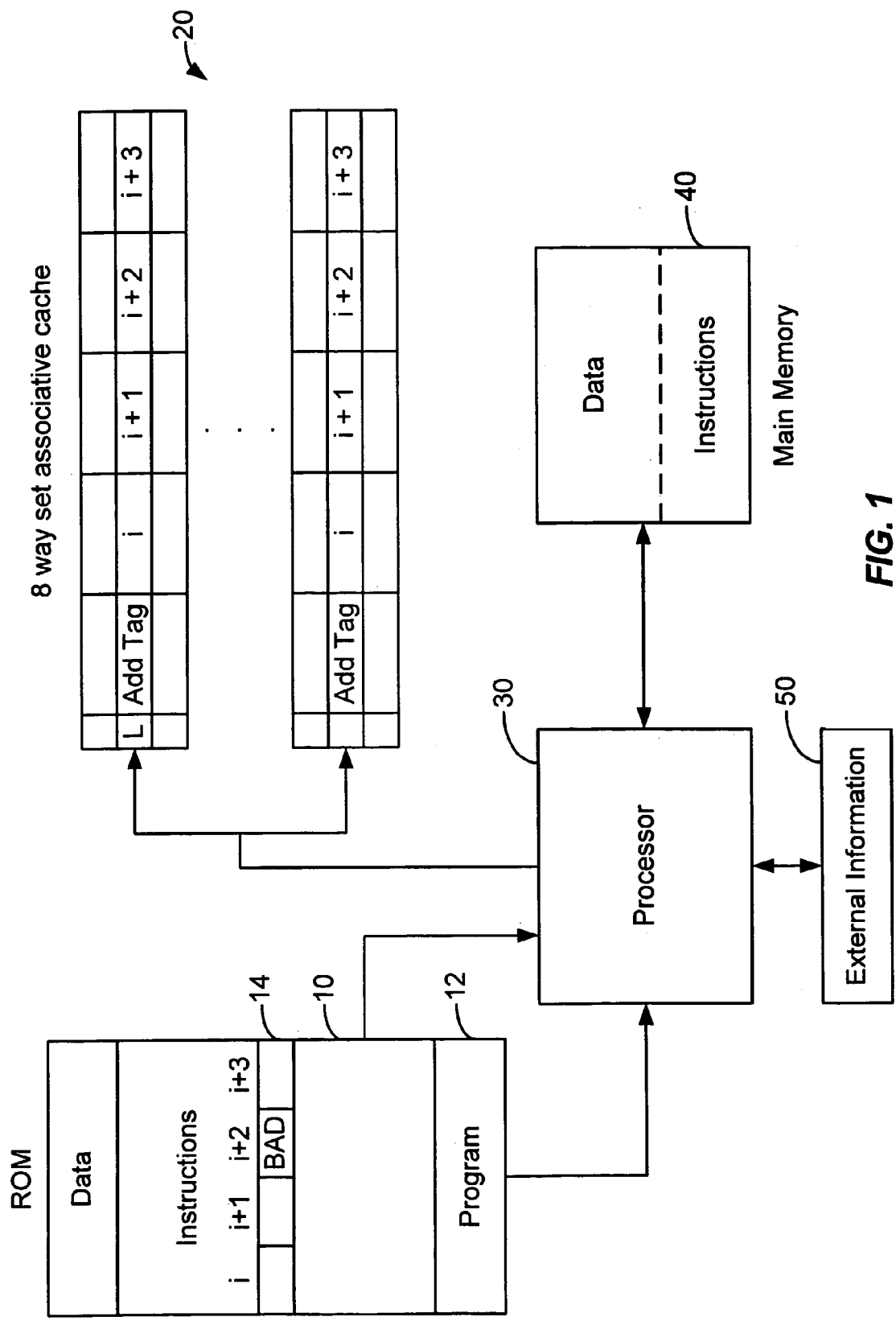
FIG. 1 is a diagram illustrating a preferred embodiment of the invention.

FIG. 1 is a block diagram of some typical components found on a single integrated circuit chip used to provide an embedded system, sometimes referred to as a system on a chip. The depicted system includes a ROM 10, an instruction cache 20, and a processor 30. In addition, a main memory 40 is also provided, typically separate from the on-chip components. In general the main memory or external memory will be a volatile memory, for example a dynamic random access memory, although in some implementations, a nonvolatile memory, such as a flash memory, is used. In small systems it may not be necessary to provide the main memory separately from the chip, but instead to incorporate onto the integrated circuit itself an array of the desired number of DRAM memory cells.

The instruction cache 20 shown in FIG. 1 represents the level of memory hierarchy between the CPU and the main memory. Cache 20 is preferably a multi-way set associative cache. In other words, blocks of information from the ROM or from the main memory can be placed in multiple places in the cache. For example, in the preferred embodiment, an 8-way set associative cache is used. In a 8-way set associative cache, there are 8 places, or 8 memory blocks, where information for a given memory location can be stored. As shown in the diagram, an address tag is stored with the data for each block indicating the complete address of the data or instructions, thereby enabling retrieval of the correct information from the cache for a particular address.

When the cache is used, the tag for every cache block that might contain the desired information is checked to see if it matches the address from the CPU. Typically, all block tags are searched in parallel at the particular address. If a tag matches the address from the CPU, there is a "hit" and the contents of the cache are used for the operation. To retrieve the desired portion of information from the set associative cache, the CPU provides an address, typically which is divided into two fields. These two fields are used to find the correct address of the instruction or data in the cache. The lower bits typically describe the entry into the cache blocks and the upper bits stored in the tags form the complete address. As an example, a 16 kb 8 way set associative cache has 8 banks each with 2 kb of memory. Each line in the cache is 16 bytes and is described by the least significant 4 bits of the address bits (a3:a0). The 7 bits (a12:a4) are used to address each of the blocks. The 25 bits (a31:a13) are stored in the tags if the address space is 32 bits. Frequently in embedded systems the total address space is 24 bits, so the actual tag bits stored are only 17 bits (a23:a13). The cache 20 shown in FIG. 1 also includes a lock bit "L" in the tags that controls whether that line in the cache may be replaced. Setting the lock bit prevents that cache line from being replaced (deleted) from the cache. Unsetting the lock bit allows that line of the cache to be replaced, for example, using a least-recently-used algorithm. In a preferred embodiment, cache 20 is an instruction cache with at least 16K bytes, a 16-byte line size, and eight-way set associative.

Generally speaking, this invention operates by storing into the cache 20 replacement information for the bad instructions or data stored in ROM 10. By storing the replacement information in the cache and setting the lock bit and line valid bits, the cache will subsequently not replace the good information now stored in the cache with the original bad information from the ROM. A more detailed explanation follows. While in the preferred embodiment an instruction cache is used to implement the invention, the cache memory can be of the unified type where both instructions and data are stored in the same cache memory. If so, all other features are the same and the operation is the same.

ROM 10 can store instructions and data, and as will be described includes a small special program portion 12. While in the preferred embodiment, this small program portion is located in ROM 10, it can also be located in another ROM internal or external to the embedded system chip or downloaded from an external source, or stored in another type of memory. As an example to explain the invention, assume that ROM 10 also includes a bad instruction word at location 14, offset by two words (i+2).

At the time the system is initialized, processor 30 executes special program 12 to determine whether any of the data in the ROM needs to be replaced. It determines this by resort to an external source of information 50 such as a website accessible over the internet, an accompanying flash memory chip, etc. This source indicates whether there is an error, or other reason to replace the data, and if so, supplies the good data and/or instructions back to the processor. If the program determines that there are no words in the ROM requiring replacement, then the special program ceases activity, and the system operates in a normal manner as a conventional embedded system or system on a chip.

On the other hand, if when the program 12 operates, it determines that some of the words in the ROM should be changed or replaced, those words are then retrieved from the external information source 50 and stored in main memory 40, and loaded into the cache memory 20. In this example the external information source will indicate replacement of the word at location i+2 is necessary, and will provide that replacement information. (Of course the replacement information can be provided from a different source than the source indicating the existence of replacement information.)

The operating system or supervisor or control program issues special instructions to the cache memory that loads the new instruction i+2 (or data) into the cache memory at the proper location and sets the lock bit and valid bits for such words to preclude them from being replaced later by incorrect information. Typically only the supervisor can unlock the locations in the cache memory. (There could be special uses however, where after the first use or a certain number of uses the location can be replaced. Such implementations can provide special security purposes. For example in a secure system a bad code might actually be programmed into the ROM and after obtaining a special one time code the new code is locked into the cache. After some special circumstances such as time, the code location is unlocked and invalidated or replace with a bad code no longer allowing access.)

Once the correct instructions and data are loaded into the cache, the system operates primarily in a normal manner. In normal operation, the processor will first load the instructions from the ROM 10 into the cache 20 where they can be executed by the processor. The lock bit will prevent the instruction at that tag location from being replaced by the data from the ROM. This assures the processor retrieves the corrected (or revised) instruction when it accesses that tag address, and prevents the processor from retrieving the original bad data from the ROM.

The result is that when the processor attempts to fetch a known bad instruction from the ROM, the Icache does not fetch the bad instruction because there is a hit in the I cache. The Icache thus provides the previously-stored corrected instruction. This previously-stored instruction, in turn, can be just a single instruction, or it can contain a branch to anywhere in the system to transfer control to a block of new code or fix up code stored in a flash memory or in the main memory. This allows for replacement of many lines from the ROM without need of storing them all in the cache. At the end of that code (and it may be just one word), the system branches back to a good portion of the ROM.

In a preferred embodiment, when the program 12 in ROM 10 first ran, it checked the main memory, and the main memory provided the information that word i+2 was bad. This information had been loaded into the main memory at the time of boot up of the system. It is possible for the program 12 stored in the ROM or external memory to contain instructions that the computer or central processor or controller uses to load the cache memory with any new word to be used instead of the word located at location i+2 in the ROM. In another embodiment an external controller or special engine can perform all of the special checking and updating of the cache memory. This is particularly suitable for a system that has a DSP ROM, but is basically a coprocessor with no or little ability to access or control the system resources. In this case the primary control mechanism or processor can perform the checking for bad instructions or data in the ROM and storing of data or instructions in the cache.

In the case just described, only a single bad instruction was present. As mentioned above, however, if an entire section of the ROM requires replacement, the entire replacement routine can be loaded into the instruction cache, or just a single branch instruction is stored in the cache which will cause the instruction flow to continue at some other location in another memory containing the instructions. At the completion of the new instructions, a return branch is used to return to the good code in the ROM. Furthermore, while all of the preceding discussion has been with respect to bad instructions, it will be appreciated that the same technique may be used to correct for bad data stored in the ROM with replacements in a data or unified cache.

In the unlikely event that a large block of data needs to be replaced in the ROM, it may be difficult to replace all of the locations by the technique described before, If so, a modification to the approach is described below. The programming technique used can be to use an index into the data area with the index pointer stored in the ROM. If the data pointed to in the ROM by the index pointer needs to be replaced, then only one data reference, the index, needs to be replaced for an entire block. This replacement can be implemented as described earlier.

Figure 2:
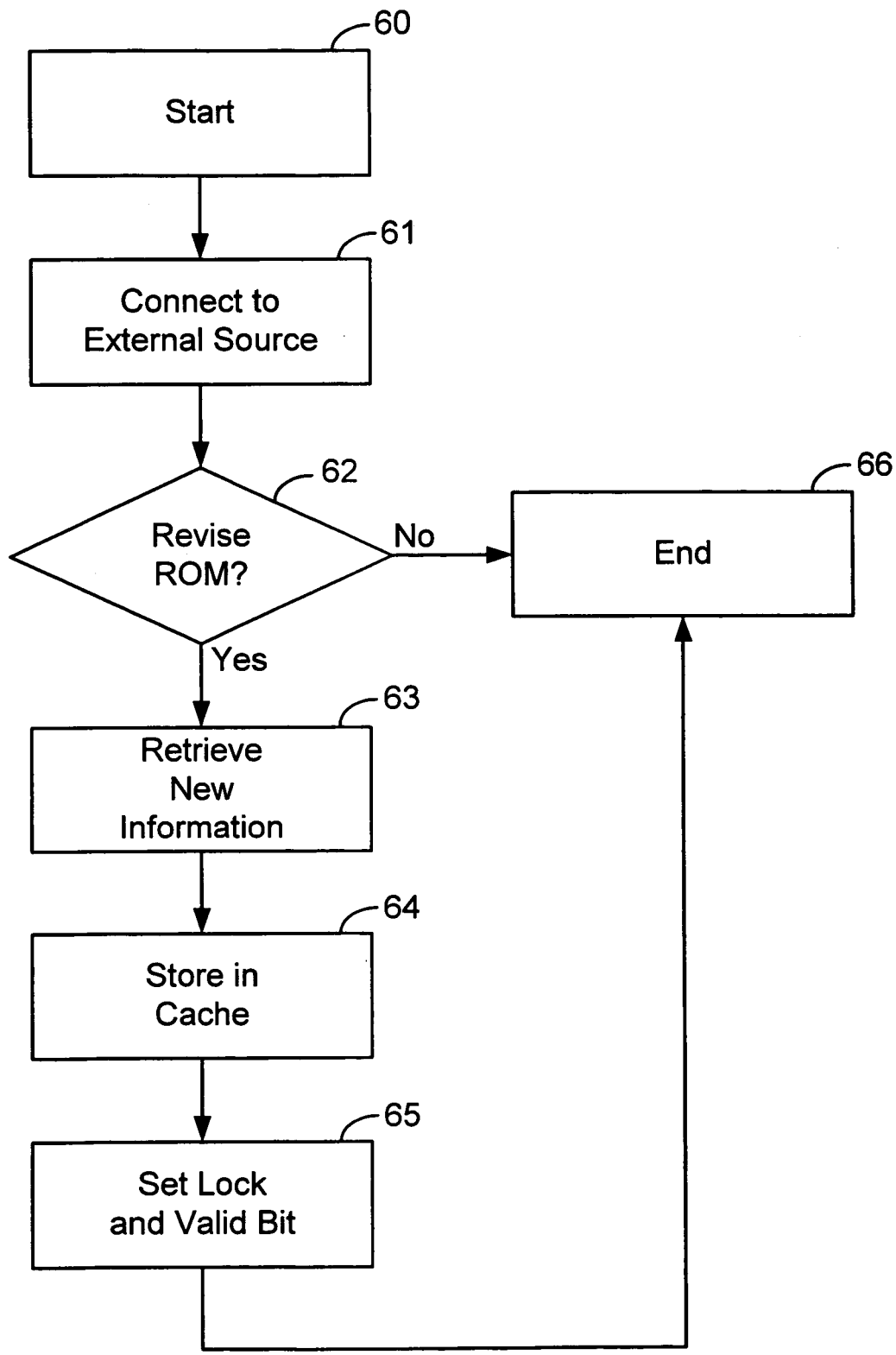
FIG. 2 is a flowchart of software used in implementing the invention.

FIG. 2 is a flowchart illustrating the operation of the stored program 12 shown in the ROM in FIG. 1. As mentioned above, a separate ROM or other source for the stored program may also be provided in lieu of incorporating it within the ROM. After the program begins operation, it connects to an external source 61. The external source, as mentioned, is preferably a source off the chip upon which the program is stored. The external source has previously been prepared to contain information to indicate that the contents of the ROM 10 are either correct or require revision.

At step 62 the external source provides information to the stored program about whether the ROM requires revision. If the ROM does not require revision, then the program ends at step 66. On the other hand, if the ROM does require revision, then at step 63, the system retrieves that new information. At step 64 the new information is then stored in the cache memory 20. This operation may include storing it in an intermediate location such as main memory 40, before moving it to the cache memory 20. Finally, as shown by step 65, the lock and valid bits are set, and the operation is completed.

The preceding has been a description of the preferred embodiment of this invention. It should be appreciated that while many details have been provided with respect to specific operations of the invention, the scope of the invention is defined by the appended claims.

What is claimed is:

1. A system comprising:
   a nonvolatile memory having locations for the storage of first information;
   an external memory having locations for the storage of revised information to use as a replacement for at least some of the first information stored in the nonvolatile memory;
   a cache memory having addressable storage locations wherein the revised information can be stored, and having a designator to preclude replacement of the revised information stored in at least one of the addressable storage locations; and
   a start-up program executable by a processor for executing a series of instructions to determine whether there are any locations in the nonvolatile memory at which the first information stored is to be replaced with the revised information, and if the start-up program determines that there are such locations, causing the retrieval of the revised information and its storage into the cache memory, whereby the revised information to the first information stored in the nonvolatile memory can be made available to a system without modification of the nonvolatile memory.

2. A system as in claim 1 wherein the start-up program is stored in the nonvolatile memory.

3. A system as in claim 2 wherein the nonvolatile memory and the cache memory are together both formed on a single integrated circuit.

4. A system as in claim 1 wherein the cache memory comprises a set-associative cache memory.

5. A system as in claim 4 wherein the cache memory includes a lock bit for preventing a user of the system from replacing the revised information.

6. A system as in claim 1 wherein the start-up program is stored in another memory.

7. A system as in claim 1 wherein the system includes a processor, and the revised information comprises instructions for operation of the processor.

8. A system as in claim 1 wherein the revised information comprises one of instructions and data.

9. A system as in claim 1 wherein the cache memory comprises a set associative cache memory.

10. In a computer system including a non-volatile memory having information stored therein, a system for replacing at least some of the stored information in the non-volatile memory comprising:
    a start-up program for determining whether the information requires replacement, and if so retrieving replacement information; and
    a cache memory for storing the replacement information, the cache memory further including at least one indicator which may be set to prevent modification of the replacement information, whereby the computer system uses the replacement information from the cache memory in place of the information from the nonvolatile memory.

11. A system as in claim 10 wherein the non-volatile memory comprises a read-only memory.

12. A system as in claim 10 wherein the computer system comprises an embedded system including a processor on an integrated circuit, and the non-volatile memory is on the integrated circuit.

13. A system as in claim 10 wherein the replacement information comprises a branch instruction which causes the computer system to retrieve instructions from a source referred to by the branch instruction.

14. A system as in claim 10 wherein the cache memory comprises a set associative cache memory.

15. In a system having a cache memory, a method for revising information stored in a non-volatile memory comprising:
    providing a stored program to cause a portion of the system to check with an external source to determine whether the information stored in the non-volatile memory requires revision;
    checking with the external source to determine whether the information requires revision;
    if the external source indicates that the information requires revision, obtaining such revised information;
    storing the revised information in selected lines in the cache memory; and
    setting the selected lines in the cache memory to prevent the revised information in those lines from being replaced.

16. A method as in claim 15 wherein the step of providing a stored program comprises storing the program in the non-volatile memory.

17. A method as in claim 16 wherein the step of checking is performed when the system is first activated.

18. A method as in claim 15 wherein the step of setting the selected lines in the cache memory prevents a user of the system from resetting the selected lines in the cache memory, to thereby prevent the revised information in the selected lines in the cache memory from being replaced, yet allows an administrator to reset the selected lines in the cache to allow their replacement.

* * * * *